United States Patent

Roccotelli

[11] Patent Number: 5,813,358
[45] Date of Patent: Sep. 29, 1998

[54] SURFACE-PIERCING SURFACE EFFECT MARINE CRAFT

[76] Inventor: Sabino Roccotelli, Via Val Maira 115, 00141 Roma, Italy

[21] Appl. No.: 750,557
[22] PCT Filed: Jun. 23, 1995
[86] PCT No.: PCT/EP95/02448
 § 371 Date: Feb. 19, 1997
 § 102(e) Date: Feb. 19, 1997
[87] PCT Pub. No.: WO96/00164
 PCT Pub. Date: Jan. 4, 1996

[30] Foreign Application Priority Data

Jun. 24, 1994 [IT] Italy .................................. MI94A3126

[51] Int. Cl.⁶ ........................................................ B63B 1/16
[52] U.S. Cl. .............................. 114/272; 114/271; 114/61
[58] Field of Search ............................ 440/3, 37; 114/61, 114/283, 151, 123, 272–274, 280, 282, 281, 288–292

[56] References Cited

U.S. PATENT DOCUMENTS

| | | | |
|---|---|---|---|
| 1,024,067 | 4/1912 | Forlanini | 114/273 |
| 1,303,508 | 5/1919 | Simpson | 114/283 |
| 1,410,874 | 3/1922 | Bell et al. | 440/37 |
| 1,917,446 | 7/1933 | Hitt | 114/273 |
| 2,906,228 | 9/1959 | Wendel | 114/282 |
| 3,952,678 | 4/1976 | Weston | 114/288 |
| 4,020,777 | 5/1977 | Brown et al. | 114/61 |
| 4,237,810 | 12/1980 | Westfall | 114/288 |
| 5,063,869 | 11/1991 | Bielefeldt | 114/61 |
| 5,273,238 | 12/1993 | Sato | 114/272 |

FOREIGN PATENT DOCUMENTS

| | | |
|---|---|---|
| 495 722A1 | 7/1992 | European Pat. Off. . |
| 1 039 868 | 11/1954 | Germany . |
| WO 93/21060 | 10/1993 | WIPO . |

*Primary Examiner*—E. L. Swinehart
*Attorney, Agent, or Firm*—Burns, Doane, Swecker & Mathis LLP

[57] ABSTRACT

A marine or naval craft having a triple catamaran-type hull (3, 3, 4) from the bottom of which project three respective ventral fins (6, 6, 7) provided with propulsion and control means (14, 17, 18) and which support a load platform (5) having a wing-like longitudinal section suitable for producing aerodynamic lift at speed.

10 Claims, 2 Drawing Sheets

SURFACE-PIERCING SURFACE EFFECT MARINE CRAFT

BACKGROUND OF THE INVENTION

1. Field of the Invention

The present invention relates to a marine or naval craft provided with a triple trimaran-type hull.

2. Description of Related Art

At present naval crafts of the type called trimaran are known, consisting of a set of three hulls placed one in the middle and the other two on each side with their longitudinal axes parallel to each other, that make it possible to obtain very slender hull shapes with moderate total drag values at high speed, through the reduction in residuary resistance as a result of the reduction in Froude number, with respect to a hull of the same displacement; the transverse stability which becomes unacceptable for ships with very narrow shapes, in this case is assured by the two lateral hulls which, being a long way from the longitudinal symmetry plane, provide substantial stabilizing moments. Since trimarans are displacing or semidisplacing craft, however, the reduction in total drag is relative because the reduction in residuary resistance is accompanied by an increase in viscous drag due to the fact that by dividing the total displacement over more than one hull there is an increase in the wetted surface.

Land and naval vehicles are also known of the type called WIG (Wing in Ground Effect Vehicles), which, by means of appropriately distributed and proportioned lifting contours, allow the weight of the vehicle to be totally supported by aerodynamic effect, freeing itself completely from the ground, allowing the drag to be reduced compared with a naval or land vehicle of the same weight and speed because, in the case of the naval craft, aerodynamic drag, due to an air density of 1.29 kg/m$^3$, replaces hydrodynamic drag, due to a water density of 1.026 kg/m$^3$ (sea water) and, on the whole, of a much higher value. Craft whose lift depends solely on the above mentioned wing contours, however, having no physical contact with the water surface, present the well-known, hitherto unresolved problems that have prevented their practical exploitation. Of these drawbacks, the main ones are the poor response speed of the controls in the air which make it extremely dangerous to fly at a short distance from the water surface, as required to exploit the ground effect adequately (normally a distance of 5% less than the wing span), the poor lateral stability, the low propulsive efficiency due to the relatively low speed, even if very large, heavy and noisy propellers are used.

OBJECTS AND SUMMARY

An aim of the present invention is to create a craft of new conception consisting of elements characteristic of the two vehicles described above but organized so as to eliminate their limits, drawbacks and defects whilst exploiting their food qualities.

The essential characteristics of the naval craft claimed are stated in the attached claim 1.

The marine or naval craft of the invention has three hulls, a central main one and two lateral auxiliary ones that support a load platform shaped as an airfoil which, at speed, generates sufficient lift to almost completely support the craft; beneath the three aforementioned hulls project three ventral fins which, when the craft reaches the speed at which it almost supports itself and thus its hulls are no longer in contact with the water, remain partially immersed and pierce the free surface, maintaining contact between the craft and the see, in order to perform some functions that are typical of the craft and will be more fully illustrated below.

If one wished to describe the invention very briefly, one could say the craft of the invention is a hybrid resulting from the blending of a trimaran (three-hulled boat) and a WIG vehicle (Wing in Ground effect vehicle).

The new craft of the invention overcomes the disadvantages of the above mentioned craft belonging to prior art, has a low hydrodynamic drag having reduced the hull volumes and wetted surfaces to the minimum, has a much smaller total drag than a naval craft of the same weight because for its support it essentially exploits aerodynamic lift which is associated with relatively low drag especially at high speeds. The presence of the immersed appendages allows the use of a high frequency control system with hydrofoils and, therefore, with the very short response times typical of control surfaces in the water and the use of a typically naval propulsion system with propellers, jet drives or other high efficiency systems.

Another characteristic of the new craft that makes it completely innovative with respect to the present displacing, planing or semi-planing naval craft, resides in the fact that while in the latter the efficiency and, that is, the ratio between the weight transported and the drag tends towards zero with increasing speed, in craft of the present invention efficiency is practically constant because it depends upon the CL/CD ratio between the lift and drag coefficients, which is practically constant for a certain angle of attack of the contour.

BRIEF DESCRIPTION OF THE DRAWINGS

Other aims, characteristics and advantages of the craft will be apparent from the description given below, relating to embodiments chosen merely for the sake of non-limiting example, illustrated in the attached drawings, in which.

DETAILED DESCRIPTION OF THE PREFERRED EMBODIMENTS

Figure 1:
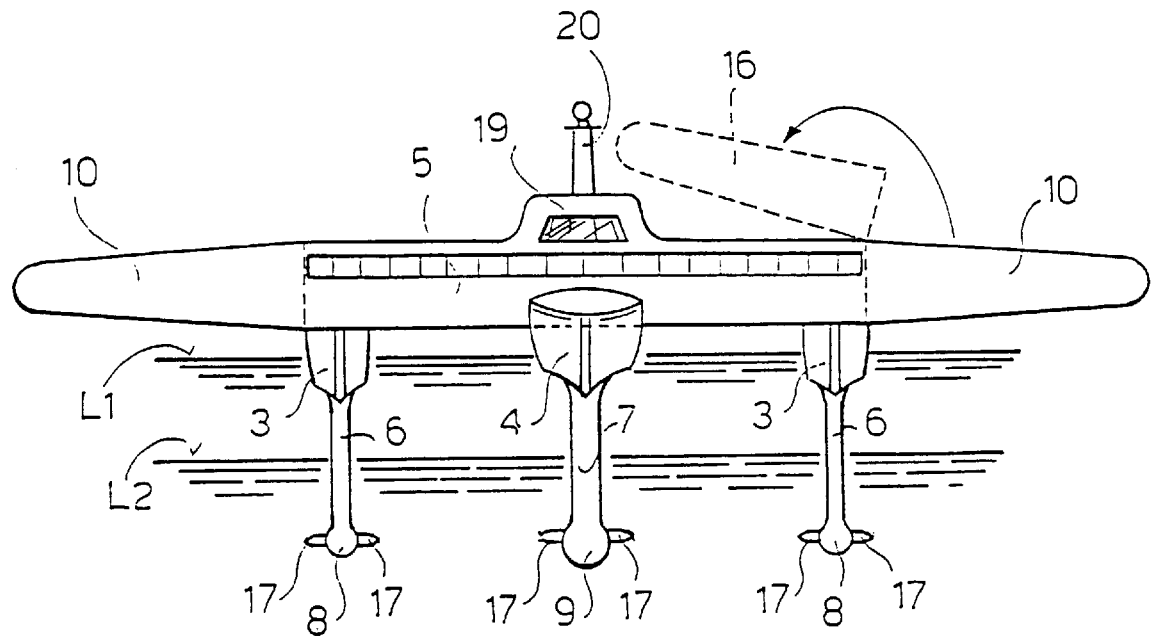
FIG. 1 is a frontal view of the marine or naval craft of the invention, according to a preferred embodiment.

With particular reference to the figures, L1 and L2 indicate the waterline when not moving or at low speed and the waterline at service speed, respectively. At the static waterline L1 the weight of the naval craft is balanced by the displacement of the hulls of the trimaran, two lateral ones indicated by 3 and one main central one indicated by 4.

The three above mentioned hulls support a load platform 5 that can be used, like the hulls themselves, for transport of passengers or any other paying load. The set of structures 3, 4 and 5 just described, consisting of three displacing hulls supporting a load platform substantially forms a typical known marine craft called a trimaran, whose operating limits have previously been described.

From the bottom of the hulls 3, 4, respectively, protrude a pair of lateral ventral fins 6 and a central ventral fin 7, with respective fusiform bodies 8 and 9 beneath.

Figure 2:
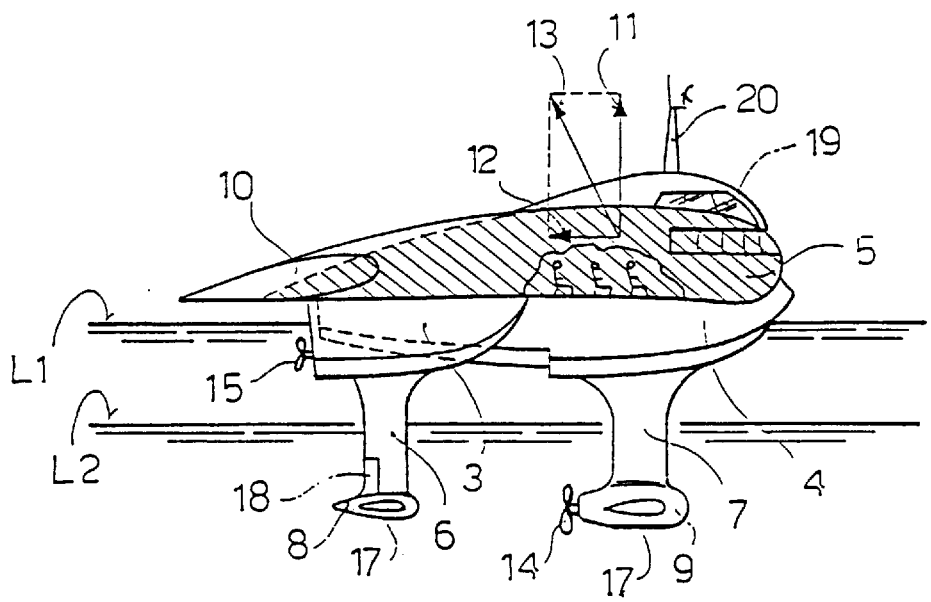
FIG. 2 is a side view of the same embodiment shown in the previous figure, with some portions omitted for the sake of clarity.

According to the present invention, the load platform 5 has a vertical longitudinal section shaped as a wing contour, as indicated schematically in the hatched area of FIG. 2. The above platform extends laterally, in the preferred embodiment, with two appendages 10, also having a section shaped as a wing contour. When the craft travels at an indefinite speed, the set of structures 5 and 10 provides a lift 11 and a drag 12 with a resultant 13. The value of the lift 11, with an appropriate proportioning of the lifting surface combined with the choice of the section of the contours, within a set speed range, allows most of the weight of the craft to be balanced. Therefore the displacement of the immersed parts 12, which at the waterline L2, corresponding to the service speed, is limited to that of the lateral 6 and central 7 ventral fins and the fusiform bodies 8 and 9 beneath them, can be reduced to a minimum, in compatibility with the performance of the functions entrusted to them, simultaneously reducing the immersed surface from which the value of the viscous component of the hydrodynamic drag derives. With this configuration, the residuary component of the hydrodynamic drag is also moderate because of the slenderness of the water plane represented by the horizontal section of the ventral fins at the waterline L2 corresponding to the service speed.

Figure 3:
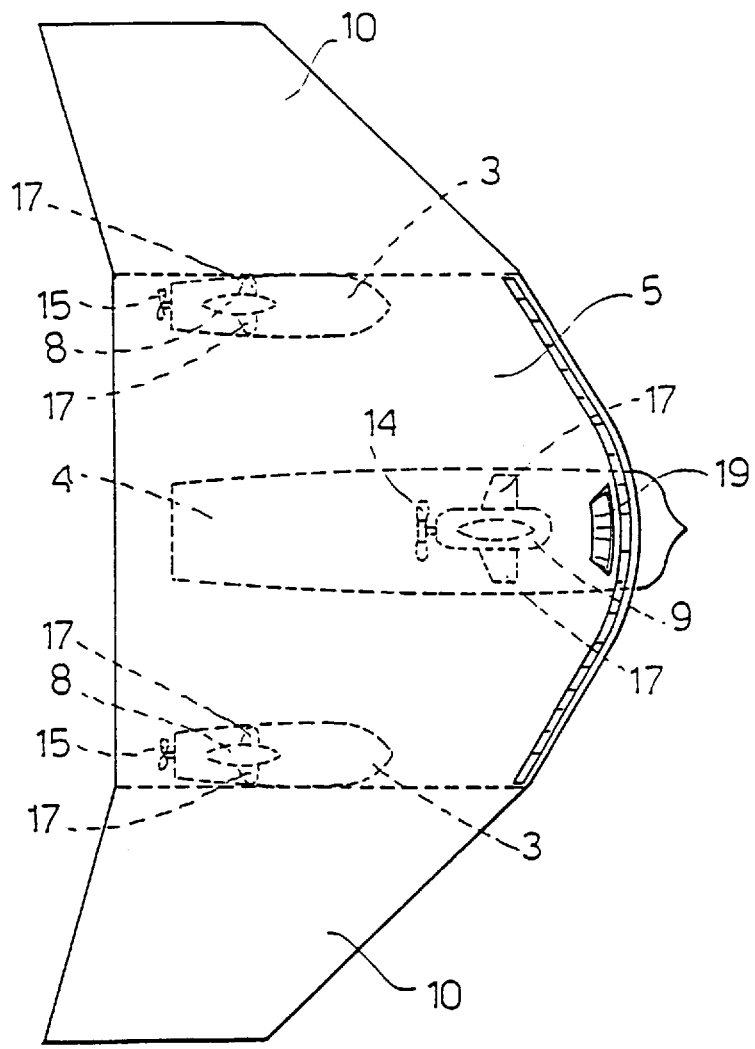
FIG. 3 is a plan view of the same embodiment shown in FIGS. 1 and 2 above, with some portions omitted for the sake of clarity.

In the preferred embodiment shown in FIGS. 1, 2 and 3, the power plant is housed in the central hull and, by means of appropriate gearing, drives a propeller 14 mounted astern of the fusiform body 9. In the case of jet drive propulsion, the sea inlets are provided on the fusiform body 9 itself whilst the feed pumps and ejectors can be installed downstream of the power plant, in the central hull 4.

Again according to a preferred embodiment, auxiliary power plants are installed in the lateral hulls 3, driving the propellers 15, and are used for mooring and casting off manoeuvres and for emergency propulsion with the craft at low speed, in trimaran attitude, i.e. with water line L1. In such attitude, when the craft is operating with displacement, at low speed, the extremities 10 can be folded upwards in the position 16 of FIG. 1 or, in any case, arranged so as to reduce the transverse dimensions of the craft and facilitate coming alongside and mooring operations, for example. For the same purpose and especially if the craft will have to enter berths with shallow water, a system to make the ventral fins 6, 7 retractable or foldable can be adopted, in order to reduce immersion when the craft is in trimaran attitude.

According to the preferred embodiment being described, pairs of horizontal rudders 17 are mounted on the fusiform bodies 8 and 9 for control of the craft in longitudinal attitude, altitude and roll at the normal service speed and, that is, with the craft supported prevalently by the aerodynamic lift. Rudders 18 are provided on the after base of the lateral fins 6 to control the course in all service conditions.

In the figures the bridge is indicated by 19 and a mast to support the radar antenna and any other sensors by 20.

I claim:

1. A marine or naval craft for traveling at a service speed, comprising:

a load platform including a portion for receiving a load;

two lateral and one central trimaran hulls that support the load platform;

a ventral fin projecting from a bottom portion of each of the trimaran hulls; and immersible bodies for achieving propulsion and for obtaining attitude control;

the load receiving portion of the load platform has a vertical longitudinal cross-section that is suitable for producing an aerodynamic lift when traveling at the service speed, wherein at the service speed, substantially all of the weight of the craft is supported primarily by the aerodynamic lift and immersed parts of the craft are reduced to a bare minimum for achieving the propulsion and the attitude control.

2. The craft according to claim 1, wherein at two sides of the load platform, respective appendages are provided, these appendages having a wing contour.

3. The craft according to claim 2, wherein said appendages can be folded towards a central part of the craft so as to reduce a transverse dimension of the craft.

4. The craft according to claim 1 wherein at a base of said ventral fins are placed respective fusiform bodies that support main propulsion and control members.

5. The craft according to claim 4, wherein said control members are horizontal rudders to control attitude, altitude and roll, with the craft in prevalently aerodynamic lift, and that said control members are vertical rudders for control of the course with the vehicle in all attitudes.

6. The craft according to claim 1, further comprising turbines for propelling the craft.

7. The craft according to claim 1, further comprising marine propellers for propelling the craft.

8. The craft according to claim 1, further comprising jet drives for propelling the craft.

9. The craft according to claim 1, in which an auxiliary power plant is situated in the lateral hulls for maneuvering.

10. The craft according to claim 9, in which an auxiliary power plant is situated in the lateral hulls for emergency propulsion.

* * * * *